United States Patent [19]
Meriwether et al.

[11] Patent Number: 5,340,250
[45] Date of Patent: Aug. 23, 1994

[54] APPARATUS FOR SECURING A LOAD TO A VEHICLE

[75] Inventors: Jon D. Meriwether, Follansbee, W. Va.; Milton J. Gelder, Richmond, Ohio

[73] Assignee: The Louis Berkman Company, Steubenville, Ohio

[21] Appl. No.: 82,395

[22] Filed: Jun. 28, 1993

Related U.S. Application Data

[63] Continuation of Ser. No. 870,931, Apr. 20, 1992, Pat. No. 5,226,764.

[51] Int. Cl.⁵ .......................... B60P 7/10; B60P 7/12; B61D 45/00
[52] U.S. Cl. ........................................ 410/99; 410/41; 206/453
[58] Field of Search .................. 410/96, 97, 98, 99, 410/100, 85, 41; 206/453, 586

[56] References Cited

U.S. PATENT DOCUMENTS

| | | | |
|---|---|---|---|
| 1,095,679 | 5/1914 | Shave et al. | 410/99 |
| 3,199,709 | 8/1965 | Morrison et al. | 217/69 |
| 3,209,706 | 10/1965 | Broling | 105/369 |
| 3,378,889 | 4/1968 | Dunderdale | 24/16 |
| 3,438,340 | 4/1969 | Pendleton | 105/369 |
| 3,637,234 | 1/1972 | Thomas et al. | 280/179 |
| 4,526,500 | 7/1985 | Patrick | 410/48 |
| 4,770,578 | 9/1988 | Coleman | 410/99 X |
| 5,226,764 | 7/1993 | Meriwether et al. | 410/99 |

*Primary Examiner*—Michael S. Huppert
*Assistant Examiner*—Stephen Gordon
*Attorney, Agent, or Firm*—Vickers Daniels & Young

[57] ABSTRACT

A strap corner for securing and protecting a transported load and increasing the useful life of the strap securing the load. The strap corner has side plates and a lower support to form a rigid strap corner. Rollers are provided for allowing equal tension throughout the strap during shifting of a load. A belt retainer to keep the strap and strap corner from becoming separated from the load during transport is also provided.

5 Claims, 5 Drawing Sheets

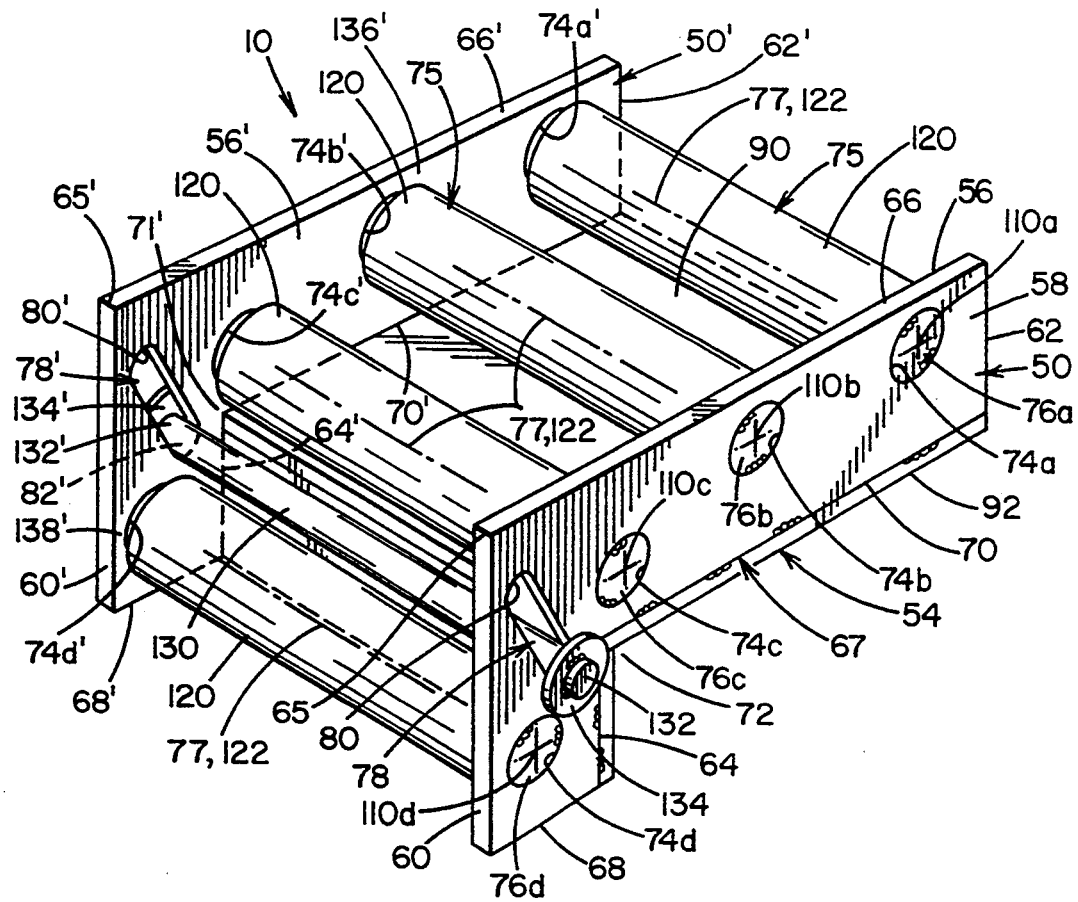
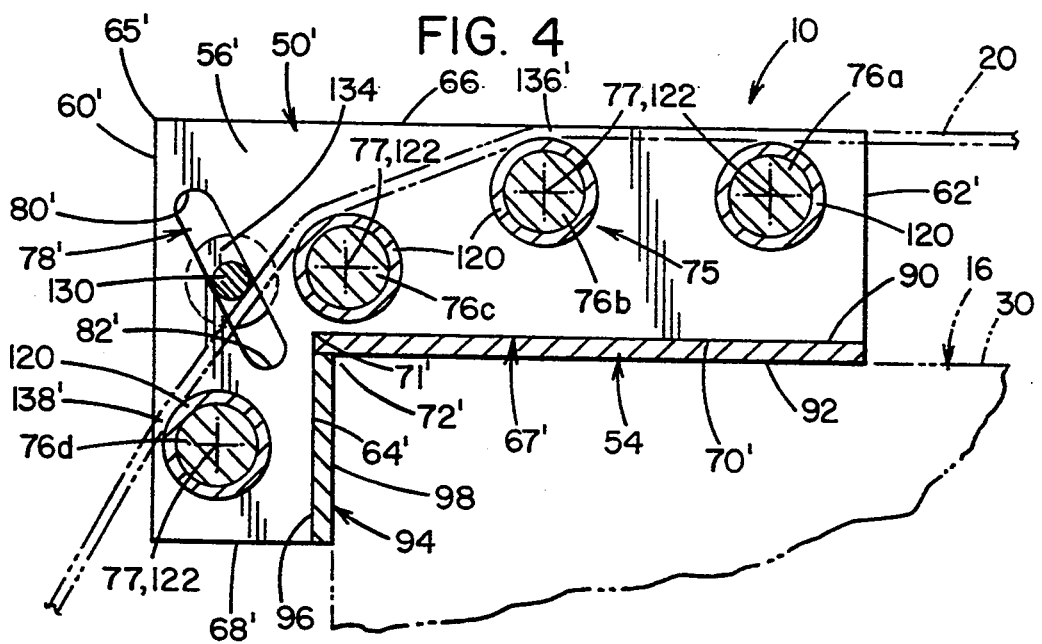

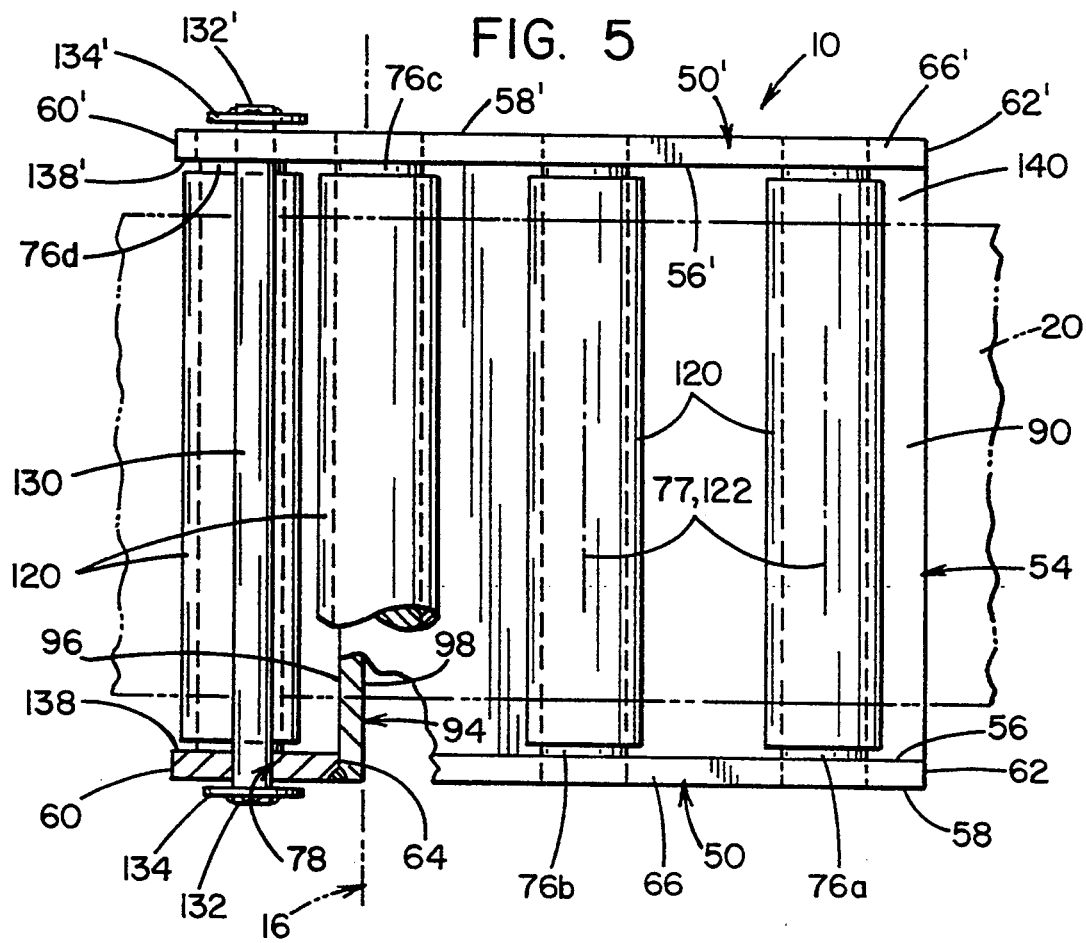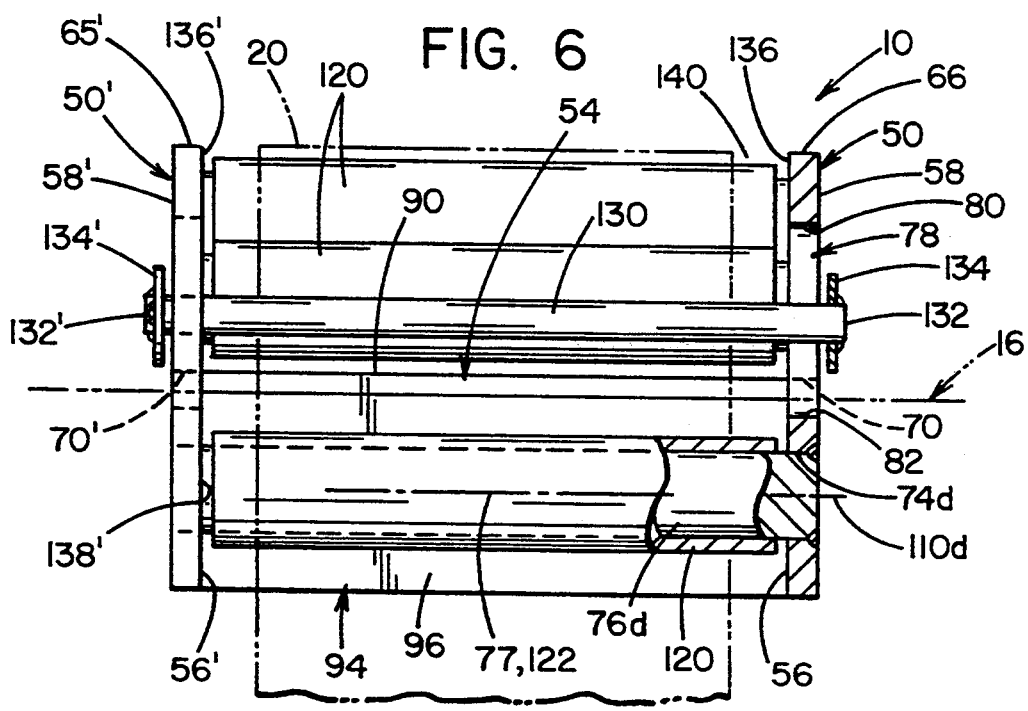

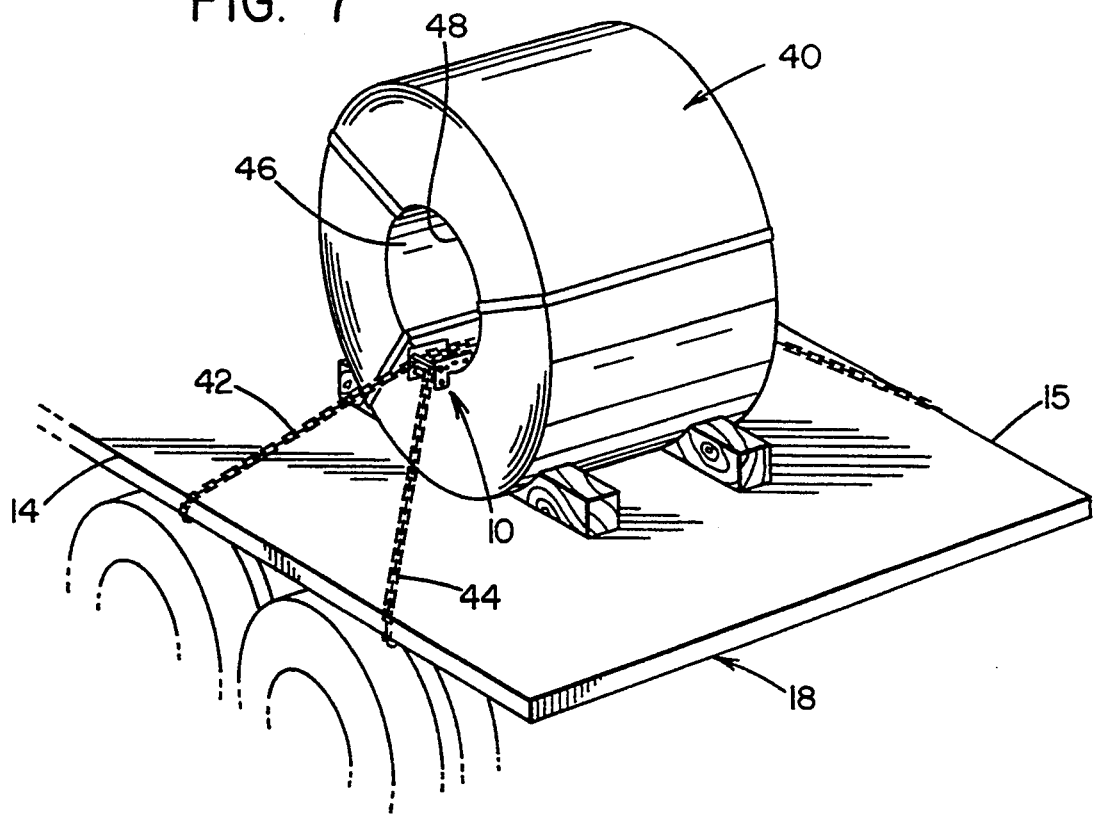
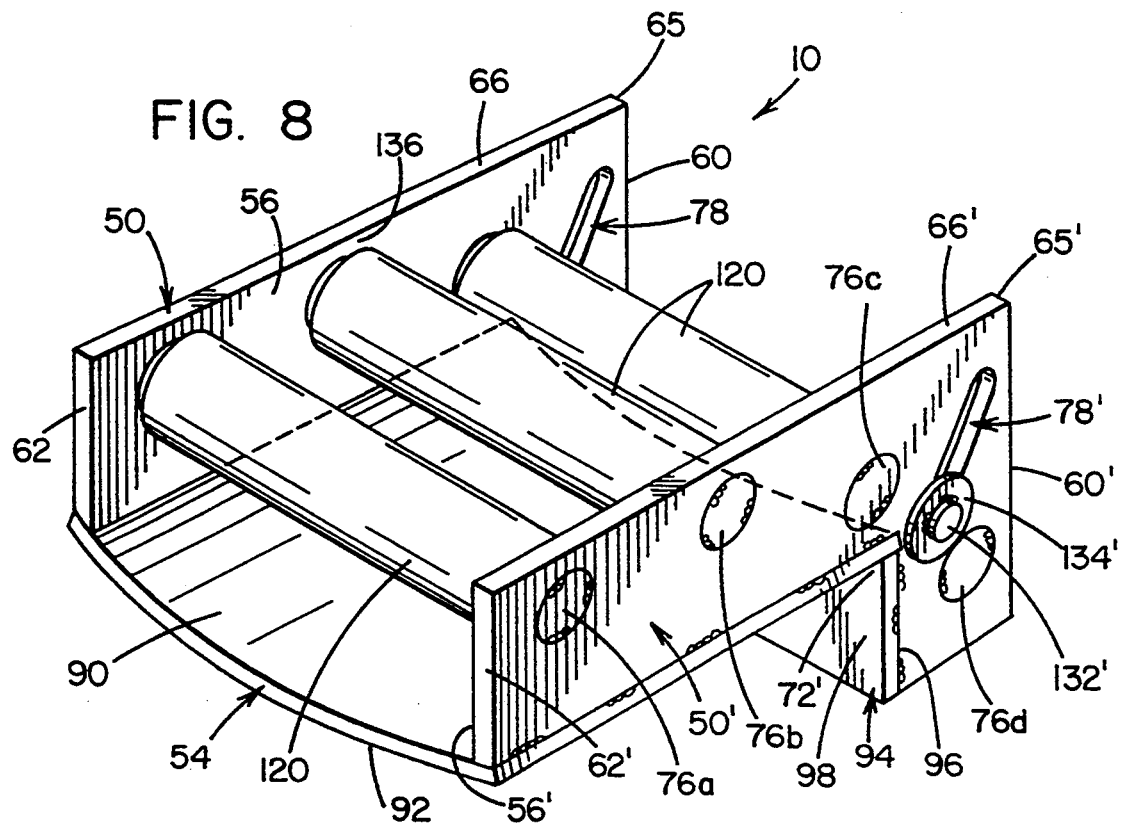

APPARATUS FOR SECURING A LOAD TO A VEHICLE

This is a continuation of application Ser. No. 870,931 filed Apr. 20, 1992, issued as U.S. Pat. No. 5,226,764 on Jul. 13, 1993.

The present invention relates to a strap corner for securely tying down a load on a vehicle, and more particularly to a strap corner for tying down a heavy, loose load on a truck or train bed. However, it will be appreciated that the invention is applicable to any application in which a strap or other device is used to secure a load.

BACKGROUND OF THE INVENTION

Strapping or tying down a load is a common means of attempting to retain a load on an open bed vehicle. Typically, a cloth strap, ropes, flexible cord, or chain is used to wrap the load, depending on the application and the type of load. For purposes here, except as noted, a generic term "strap" has been adopted. As loads vary, the type of strap also varies. A heavier load will require a stronger strap. A small item may require only one tie down strap. A large item or numerous items including stacked items or other items in palletized units, require more straps or even chains for proper securing.

After the load is wrapped, it is necessary to tension the straps in order to keep the load from shifting. Various means of accomplishing this tension are well known in the prior art. The simplest is an attempt to tie off the tie down strap tightly. More complex devices include mechanical tensioning means. These operate in various ways which usually includes binding and pulling the strap whereby the strap is placed in tension.

Many problems result from this tensioning. The largest problem results from using cloth straps over heavy loads, in particular, lifts of steel. Many materials transported in this way have rough outer surfaces. Such surfaces have a tendency to cut into the straps, thereby reducing the integrity of the load. Sudden shifts in a load at this point could result in a load catastrophically falling from a vehicle bed thereby affecting the safety of any person or property nearby at the time. In addition, the goods being transported are either damaged or destroyed.

However, more likely is that the cloth strap which is cut does not completely sever. Instead, the cut results in loosening of the load due to stretch of the fabric material. As a consequence, the reduction of tension of the cloth strap results in the strap having the ability to slide across the load. The strap may slide off the load or alternatively, slide enough to allow the load to shift, resulting in damaged goods. In such shifting, the load can violently impact the strap. The impact can also lead to a severing of the strap resulting in the load falling from the vehicle bed, causing injury to person and property, and damaging the goods being transported.

Further, even when the load makes it safely to its destination, the cloth strap is cut and damaged. Therefore, cloth straps can only be used once before disposal is required. Attempts to repair a cut strap in a manner which preserves its strength have proved impractical and cost-prohibitive.

Chains have been used as tie-down straps in an attempt to overcome the inadequacies of cloth straps, and to provide added strength to prevent load shifting. However, chains, when securely tightened have a detrimental effect on the load itself. A chain tends to cut into the load on the vehicle bed, damaging, or in extreme situations, destroying the goods. This result has been seen even where the goods are lifts of steel or steel coil.

By cutting into the surface, the tension in the chain is further reduced, allowing the load to shift, which creates and further perpetuates damage. Additionally, any time a load is allowed to shift, the possibility of failure of a chain or tie down strap increases dramatically.

Prior attempts to protect the load from the cutting of a strap or to protect the strap from damage have not been successful. These prior attempts included blocks of wood and rags placed at a load corner which would tend to slide out from under the strap. In addition, the device falls off the load in transport and is lost. This prevents re-use and creates safety hazards on the roadway.

Prior art strap corners also do not remain in place. They tend to slide out from under the strap. This sliding effects the tension in the strap. If a strap corner slides on the load while the tie-down strap remains in contact with the strap corner, the strap stretches. If the strap returns to its original position, tension in the strap is now reduced, and the load is allowed to shift. If, instead, the strap corner slides out from under the tie down strap, a void is created between the load and the strap. The resulting reduction in tension in the strap allows the load to shift, creating all of the inherent problems associated with load shifting.

Secondly, if a strap corner slides loose from between the strap and the load, it usually does so in transport and becomes lost. As discussed hereinabove, strap corners will normally experience some sliding along the load due to load shifting and stretching of the strap. The resulting loss in tension of the strap can result in the strap corner sliding out from between the load and the strap. This typically results in a loss of whatever material is being used as a strap corner. Such falling objects create a hazard to both person and property when lost on various roadways or railways.

SUMMARY OF THE INVENTION

Accordingly, it is an object of the present invention to overcome the disadvantage of the prior art by providing a strap corner which protects the load from damage and the strap from being cut or severed while also preserving the strap corner from loss due to normal movement of the tie-down strap and the strap corner on the load.

This object along with other features of the invention is achieved by providing a strap corner for tying a load having a first side plate, a second side plate parallel to the first side plate, a lower support means which interconnects the first side plate to the second side plate, a slide means which is orthogonal to the first side plate and the second side plate over which a strap passes, and a retaining means which holds the tie-down strap in contact with the strap corner should the strap corner slide out of place.

In accordance with a more specific feature of the invention, there is provided a strap corner wherein each side plate extends a longitudinal distance between axial ends. The side plates have an upper edge and a lower edge with the lower edge transversely spaced from the upper edge. The lower edge further has a bearing edge segment adjacent one axial end, a bottom edge segment adjacent the opposite axial end and a leg edge segment in between the bottom edge segment and the bearing edge segment. The bearing edge and the leg edge segments form a generally V-shaped notch at their intersection. The lower support means includes a support plate extending between the side plates from the bearing edge segments. Further, a bottom plate extends between the side plates from the leg edge segments, whereby the force of the strap means is evenly transferred to the load by at least the bottom plate and/or the support plate.

In accordance with another important feature of the invention, the slide means for moving a strap means over the corner is rotatably mounted to the first side and the second side. The slide means includes at least one roller pin extending between its axial ends and at least one roller for rotating about a longitudinal axis. The axis terminates at a centerpoint at the first side plate and the second side plate, the roller pin interconnecting the first side plate and the second side plate. The center point of the roller pin will be located substantially adjacent to the intersection of the notch of the first side plate and second side plate.

In accordance with a more specific feature of the invention at least three roller pins and at least three rollers are provided for rotating about a longitudinal axis. Each of the axes terminate at a centerpoint at the first side plate and the second side plate, the roller pin interconnecting the first side plate and the second side plate. Each of the rollers rotate about one of the roller pins, and each of the roller pins and the roller means are parallel to each of the other roller pins and roller means. The centerpoints of the roller pins are located on a common arc having a single arc radius. The spacing of the slide means allows the strap to pass over the corner gradually without coming into contact with any sharp corners on the load thereby preventing binding or severing of the strap. The slide means, including the roller and roller pin, allow the roller to rotate about the fixed roller pin. Rotation of the slide means provides greater flexibility in the type of strap used, eases wrapping a load, and allows tension in the strap to be distributed uniformly to the load.

Yet in accordance with another feature of the present invention a strap corner is provided with slide means including four roller pins and four rollers. The centerpoint of the fourth roller pin is located adjacent the centerpoint of one of the roller pins located on the common arc to provide an additional outer surface coincident with the length of the bearing edge segments for contacting the strap means, whereby the strap means is more evenly tensioned.

Yet in accordance with another feature of the invention there is provided a belt retainer which extends between axial ends and is slidably mounted to the first side plate and the second side plate, the strap being interposed between the slide means and the belt retainer whereby the strap corner is prevented from falling off the load.

Yet in accordance with a still further feature of the present invention each of the first side plate and the second side plate has a retainer slot with an upper end and a lower end. The upper end is substantially adjacent to the intersection of the upper edge and one of the axial ends, the retainer slot then extending towards the lower end which is substantially adjacent to the notch intersection. The retainer slot in the first side plate is substantially aligned with the retainer slot in the second side plate, thereby allowing the retaining means to be slidably mounted in the retainer slot by a means for fixing each of the axial ends of the retaining means.

Still further in accordance with another aspect of the present invention, the lower radial end of retainer slot is curved and the center of lower radial end is located on the common arc on which the centerpoints of the roller pins are located to insure functioning of the retainer means.

Yet still further in accordance with another aspect of the present invention the retainer slots have an angle from about 25° to 65° relative to the axial ends of the first plate and the second plate.

Yet in accordance with another aspect of the invention each of the side plates has an inside surface and an outside surface. Each of the inside surfaces further have an upper lip portion and a lower lip portion, the strap corner having a channel between the upper lip portion of the first and second side plates and the lower lip portions of the first and second side plates. The upper lip portion is that portion of the inside surface of the plate extending transversely from the upper edge of each of the plates to the outer surface of the slide means adjacent the upper edge. The lower lip portion is that portion of the inside surface of the side plates extending axially from one of the axial ends to the outer surface of the slide means adjacent that axial end, whereby the channel retains the strap means on the strap corner.

In accordance with another aspect of the present invention the support plate has a curvilinear surface adapted to fit over and maintain substantial side by side contact with a load having a curved surface.

In accordance with still another aspect of the present invention, a method of securely tying a load by strap means on a vehicle transport bed is provided comprising the steps of:

providing at least one strap means for fastening the load to the bed;

fastening the tying means to an edge of the bed;

providing a first strap corner and a second strap corner each of the strap corners having a first side plate and a second side plate parallel to the first side plate, slide means orthogonal to the first side plate and the second side plate for moving a strap means over the corner, and retaining means for holding the strap means in contact with the corner. Further passing the strap means between the retaining means and the slide means of the first strap corner and placing the first strap corner at one of the top edges of the load, and advancing the strap means over the top of the load. The strap means is then passed over the slide means and between the retaining means and the slide means of the second strap corner and the second strap corner is placed at another of the top edges of the load. The strap means is then advanced down one of the lateral sides of the load which is substantially parallel to one of the longitudinal edges of the bed. Finally, the strap is tensioned over the load, whereby the strap corners are tightly held over the top edges.

Further in accordance with a specific aspect of the invention the method comprises the additional steps of providing at least two strap means for fastening the load to the truck bed.

Still further in accordance with another aspect of the invention the strap means for fastening the load to the bed includes an elongated cloth strap.

The principal object of the invention is to provide a strap corner which prevents a cloth strap from being cut.

It is another object of the invention to provide a strap corner which protects a load from being damaged by a chain strap.

It is a further object of the invention to provide a strap corner which preserves the useful life of a strap.

Another object of the invention is to provide a strap corner having a uniform surface over which a strap can be more efficiently tensioned.

Yet another object of the invention is to provide a strap corner which prevents sliding of the strap along the load.

Still another object of the invention is to provide a strap corner which will not separate from the strap should said strap corner slide off a load.

Still yet another object of the invention is to provide a strap corner which will not fall off a transported load creating a safety hazard.

Further, another object of the invention is to provide a strap corner which cannot slide out from under the strap.

Yet another object of the invention is to provide a strap corner which prevents a strapped load from shifting, thereby preserving the integrity of the load and furthering transportation safety.

A still further object of the invention is to provide a strap corner which is simple, easy to construct and inexpensive.

Yet another object of the invention is to provide a strap corner which securely grips the load without marking or marring the load while permitting the strap to be sufficiently tensioned.

These and other objects of the invention will become apparent to those skilled in the art upon reading and understanding the detailed description in the following section.

BRIEF DESCRIPTION OF DRAWINGS

The invention may take physical form in certain parts and arrangement of parts, a preferred embodiment of which will be described in detail and illustrated in the accompanying drawings which form of parts hereof and wherein:

FIG. 3 is a perspective view illustrating the strap corner.

FIG. 4 is a cross-sectional view taken along line 4—4 of FIG. 1.

FIG. 5 is a top view of the strap corner taken in partial cross-section.

FIG. 6 is an end view of the strap corner taken in partial cross-section.

FIG. 7 is a pictorial view showing the use of a strap corner with multiple tying means.

FIG. 8 is a perspective view of an alternative embodiment where the lower support means is a curvilinear surface adapted to fit over such a load as shown in FIG. 7.

THE PREFERRED EMBODIMENT

Figure 1:
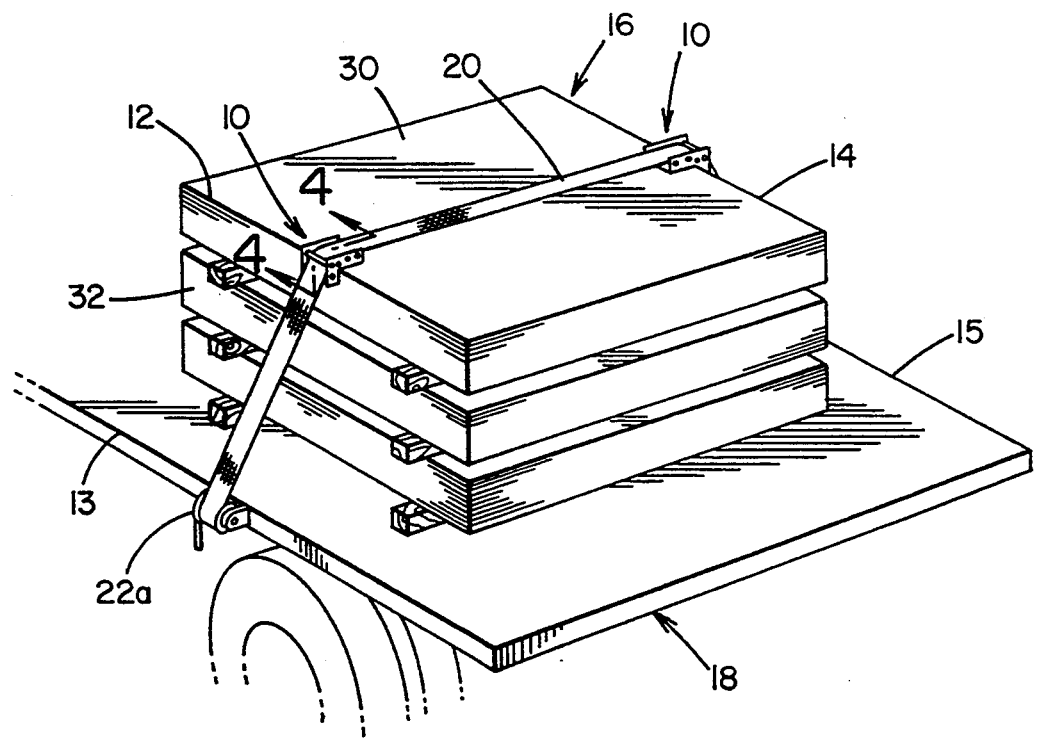
FIG. 1 is a pictorial view illustrating a strap corner as placed over a stacked load on a truck bed.

Referring now to the drawings, wherein the showings are for the purposes of illustrating a preferred embodiment of the invention only and not for purposes of limiting same, FIG. 1 shows a strap corner 10 placed on top corner edges 12 and 14 of a stacked load 16 having the lateral sides 32 and 34. As seen, top corner edges 12, 14 are substantially parallel with the longitudinal edges 13 and 15 of flatbed vehicle 18. Load 16 is held in place on a flatbed vehicle 18 by means of a strap 20 and strap corner 10, strap 20 being tensioned into place by a tensioner 22.

Figure 2:
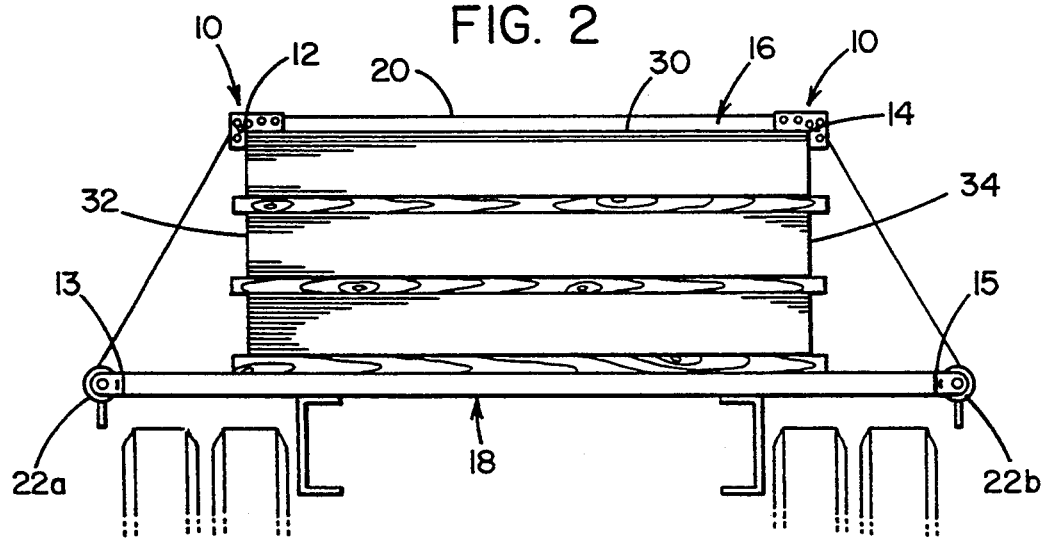
FIG. 2 is an end view showing the use of two strap corners as placed over the stacked load of FIG. 1 while being retained in place by a tensioning strap.

Referring now to FIG. 2, an end view of FIG. 1, which shows a pair of strap corners 10 tightly fitted over top corner edges 12 and 14 of stacked load 16 by virtue of tight contact between the top side 30 of the load 16 and strap corner 10. It will be appreciated that load 16 shown in FIGS. 1 and 2 is for illustrative purposes only. The load may consist of any type of stacked or palletized load providing the top corner edges 12 and 14 upon which strap corner 10 may be placed and tensioned.

For example, in FIG. 7, a strap corner 10 is shown used on a coil of steel 40. The strap corner 10 easily fits within the eye 46 of coil 40. As such, the inside circumference 48 of the coil 40 is sufficient to provide a surface similar to the top corner edges 12 and 14 of FIG. 1. Strap corner 10 is shown with the chains 42, 44 serving as a means for strapping. Strap corner 10 is adapted to fit inside eye 46 of a coil 40, whereby strap corner 10 protects chains 42, 44 from cutting into the coil 40.

An embodiment of strap corner 10 is shown at FIGS. 3–6. The strap corner 10 generally comprises a first side plate 50 and a second side plate 50'. Side plates 50 and 50' are generally parallel to each other and are interconnected by a support plate 54. Side plates 50, 50' and support plate 54 are preferably constructed of plain carbon steel of 7 gage thickness. Support plate 54 is preferably welded to sides 50, 50'. It will be appreciated that sides 50, 50' can be made from any rigid material including other steel and high strength plastics. As shown, support plate 54 is a flat plate welded to sides 50 and 50'. Support plate 54 serves to distribute, over a wide surface area, the load placed on strap corner 10 when strap 20 is tensioned. This prevents the strap corner 10 from damaging the outer surface, either top side 30 or inside circumference 48 of the load 16 or the coil 40 respectively.

First side plate 50 and second side plate 50' are for all intents and purposes identical. Thus only first plate 50 will be described in detail below. Further, reference numerals used to describe the structure of first plate 50 when followed by a prime (') will likewise describe the same structure for second plate 50'.

Side plate 50 has an inside surface 56 and an outside surface 58 extending between axial ends 60 and 62. Side plate 50 further has an upper edge 66 and a lower edge 67 transversely spaced from upper edge 66. Lower edge 67 is comprised of a bearing edge segment 70 adjacent one axial end 62, a bottom edge segment 68 adjacent the other axial end 60, and a leg edge segment 64 in between bottom edge segment 68 and bearing edge segment 70. Leg edge segment 64 and bearing edge segment 70 form a generally V-shaped notch 72 at the intersection 71 of notch 72. Side plates 50, 50' are orientated respectively to each other such that the inside surface 56' of second side plate 50' is inwardly facing inside surface 56 of first side plate 50.

Support plate 54 interconnects first side plate 50 to second side plate 50' so that plates 50, 50' are substantially parallel. In its preferred embodiment, support plate 54 has an upper surface 90 and a bearing surface 92, the upper surface 90 being in contact with the bearing edge segments 70, 70' of first and second side plates 50, 50'. Support plate 54, is then welded to plates 50, 50' to form a rigid strap corner 10. It is appreciated that support plate 54 may alternatively consist of a plurality of braces or other rigid supports which give the strap corner 10 rigidity between plates 50, 50'.

Strap corner 10 also includes a bottom plate 94 having an inside lateral surface 96 and an outside lateral surface 98. Bottom plate 94 interconnects plates 50, 50' to provide added rigidity to the strap corner 10. Bottom plate leg 94 is welded to the plates 50, 50' so that inside lateral surface 96 is in side-by-side contact with leg edge segments 64, 64'.

Placed between first and second side plates 50, 50' is at least one slide means 75 for moving strap 20 over strap corner 10. Slide means 75 is orthogonal and interconnecting first side plate 50 and second side plate 50'. Where only one slide means 75 exists, slide means 75 must be located adjacent to intersection 71, 71' of notch 72, 72' of side plates 50, 50'. This location is generally at the opening 74c, 74c' of first side plate 50 and second side plate 50'. Such location allows strap 20 to pass over slide means 75 without coming into contact with inside lateral surface 96 of bottom plate 94 or upper surface 90 of support plate 54.

It should be noted that the invention in its broadest concept, can comprise slide means 75 consisting of one roller pin 76c and one roller 120. However, in its preferred embodiment, strap corner 10 comprises three roller pins 76b, 76c, 76d and three rollers 120. To facilitate the preferred embodiment, first side plate 50, and hence second side plate 50' each has three pin opening 74b, 74c, 74d adapted to fittably receive three roller pins 76b, 76c, 76d. Roller pins 76b, 76c, 76d each have a longitudinal axis 77 terminating at the corresponding pin opening centerpoint 110. Centerpoints 110b, 110c, 110d are located on a common arc Z, having a single arc radius R shown in FIG. 9. It has been found that this embodiment allows a strap 20 to pass gradually over top corner edges 12, 14 of load 16, and to pass over strap corner 10 freely without contacting other surfaces of the corner 10. This prevents binding or uneven loading in strap 20. Additionally, such an embodiment best distributes the loading placed upon a tensioned strap 20 to strap corner 10 and subsequently load 16.

Figure 9:
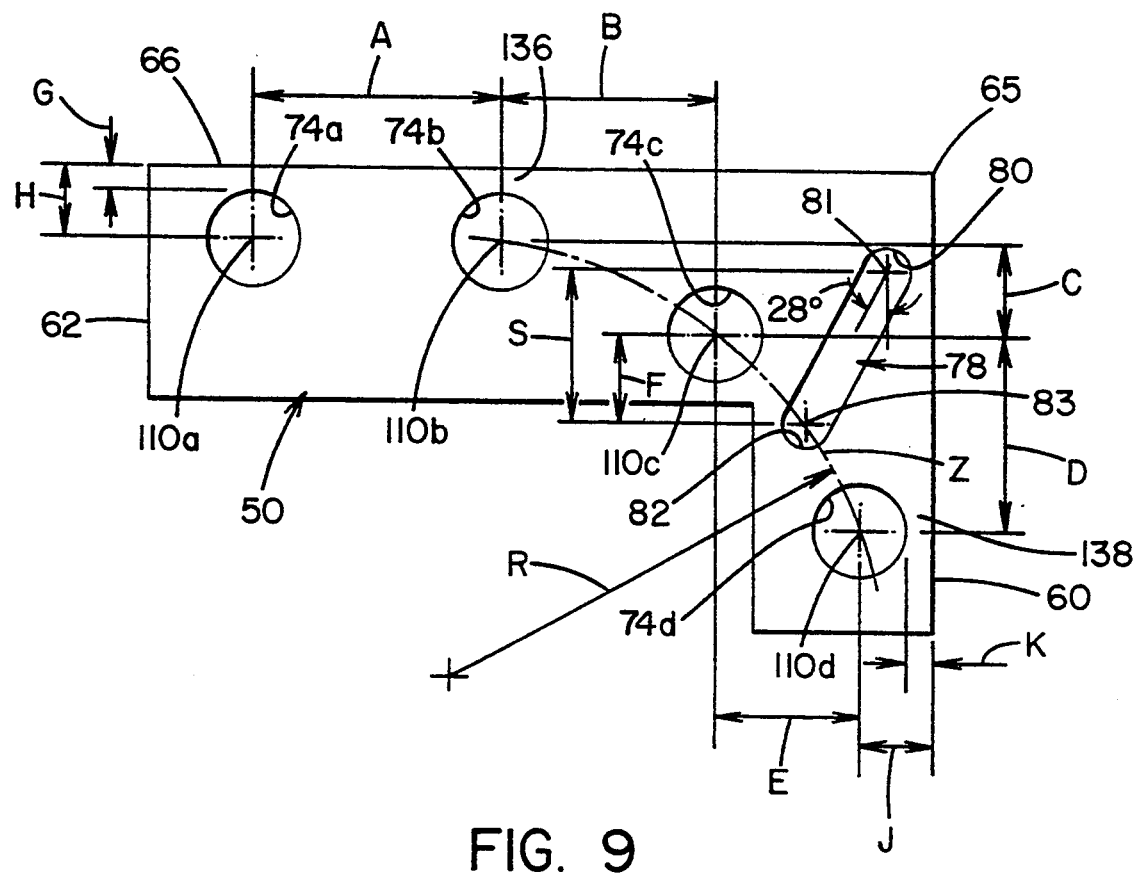
FIG. 9 is a side view of the strap corner showing relative spacings of the rollers of the preferred embodiment.

In the embodiment illustrated, the pin opening 74a and the respective roller pin 76a have been added to the preferred embodiment adjacent pin opening 74b, having a dimension A therebetween, as shown in FIG. 9. Roller pin 76a has a longitudinal axis 77 terminating at a centerpoint 110a. This embodiment results in an increase in the length of upper edge 66, bearing edge segment 70, and support plate 54 in the longitudinal direction as compared to the preferred embodiment. Such an embodiment adds roller pin 76a and corresponding roller 120 to provide an extra surface over which strap 20 distributes the tension forces to strap corner 10. Therefore, roller pins 76a–d, and roller 120 need not be sized as large as might otherwise be required. In addition, such extension prevents strap 20 from unduly sagging between strap corners 10 or strap corner 10 and tensioner 22, whereby tension in the strap 20 would be unevenly distributed.

The addition of roller pin 76a, and corresponding roller 120 results in a larger support plate 54, and therefore a larger bearing surface 92 over which tension forces are transferred to load 16. This further prevents strap corner 10 from marking, marring or otherwise damaging the load 16. Further, roller pin 76a and corresponding roller 120 allows for preplacement of strap corner 10 on load 16 prior to placing strap 20 over load 16, since the center of gravity of strap corner 10 is located substantially within the bounds of top corner edges 12, 14 and over top side 30 of load 16. It is contemplated that the longitudinal distances of upper edge 66, bearing edge segment 70, and support plate 54 may be extended in such a manner that the center of gravity of strap corner 10 is located substantially over top side 30 without adding roller pin 76a or corresponding roller 120. Finally, strap corner 10 may be weighted or otherwise modified to affect strap corner 10 to allow preplacement on load 16.

The invention will be described hereinafter with respect to the drawings and the four rollers 120 illustrated therein.

Each of pin openings 74a–d, 74a–d' is adapted to receive roller pins 76a–d. Roller pins 76 are fixed within pin openings 74, 74' by welding roller pins 76 to side plates 50, 50'. Roller pins 76 thereby further add to the rigidity of strap corner 10. By virtue of the location of pin openings 74, 74', roller pins 76 are fixed perpendicular to both first side plate 50 and second side plate 50'. Roller pins 76 each have a longitudinal axis 77 and are preferably 21/32″ in diameter.

Over roller pins 76 are placed the rollers 120. In the preferred embodiment rollers 120 are ½″ schedule 40 pipe. Such pipe generally has an outside diameter not greater than 0.84″. Rollers 120 have a longitudinal axis 122 terminating at the pin opening center point 110, substantially the same as the longitudinal axis 77 of the corresponding roller pin 76 over which roller 120 is placed. The rollers 120 are allowed to freely rotate about longitudinal axis 77, 122.

Once strap corner 10 has been placed in position over a top corner edge 12, 14, eye 46 of coil 40 or some similar edge of a load 16, the strap 20 can be placed about the load 16 by placing it across strap corner 10. More specifically, strap 20 is placed over rollers 120. The benefit to such rollers is two-fold. First, rollers 120 allow a strap 20 to be placed loosely over a load 16 and subsequently tightened and tensioned, whereby the strap 20 rolls across the rollers 120, preventing binding of the strap 20 on either the load 16 or strap corners 10 during tightening. Secondly, the rollers 120 allow the load 16 to shift somewhat during transport without effecting the integrity of the strapped load 16. Stacked loads of the type shown in FIG. 1 are prone to sidesway shifting, which is movement transverse to the longitudinal axis of the transport bed. This type of shifting is most likely due to centrifugal forces as the transport bed rounds corners or curves along a route. A load 16 strapped without the use of a strap corner 10 will experience different forces in the strap 20.

For example, load 16, shown in FIG. 2, will be described hereunder as if it was strapped without strap corner 10. If the load shifts somewhat during transport toward tensioner 22a, the position of strap 20 on lateral side 32 to which the load 16 has shifted will experience reduced tension and possibly the strap 20 will go slack between the top corner edge 12 and the tensioner 22a. However, that portion of strap 20 which is on the top side 30 of load 16 will undergo increased tension. In addition that portion of strap 20 extending between top corner edge 14 and opposite side tensioner 22b will also be under increased tension. This results in the cutting of the strap 10 along top corner edge 12 or 14. This same phenomena will occur when load 16 shifts to the opposite side, resulting in the weakening of the strap 20 in two places during a shipment, both along the top corner edge 12, 14 of load 16.

When load 16 is strapped using the strap corners 10 shown in FIG. 2, rollers 120 of strap corner 10 will prevent the undue tensioning and stretching of the strap 20. In addition, rollers 120 will prevent damage to strap 20 caused by the tensioning. As the load 16 shifts from side-to-side, the strap 20 rolls across rollers 120, thereby keeping a relatively constant tension throughout the strap 20 from tensioner 22a to tensioner 22b. This prevents the strap 20 from binding at any point along its length.

Plates 50, 50' each have a retainer slot 78. The retainer slot 78 has an upper end 80 and a lower end 82, as seen at FIG. 4. In the preferred embodiment, ends 80, 82 are radially curved. Upper end 80 of retainer slot 78 is substantially adjacent to the intersection 65 of upper transverse edge 66 and axial end 60, while lower end 82 of retainer slot 78 is adjacent to notch intersection 71, 71' of plates 50, 50', respectively. As with pin openings 74, 74' between side plates 50, 50', the placement of retainer slots 78, 78' in first side plate 50 and second side plate 50' respectively are such that there is substantial alignment between slots 78, 78'. Retainer slots 78, 78' preferably have a diameter of 5/16' in diameter.

The lower radial end 82 of retainer slot 78 is further defined by a centerpoint of the radius 83. In the preferred embodiment, centerpoint 83 is located on common arc Z of single arc radius R, as shown in FIG. 9. Such an embodiment allows that even a small strap 20 will be in rolling side-by-side contact with a belt retainer 130 slidably fixed in the retainer slot 78.

Belt retainer 130 extends between the axial ends 132, 132' and has a diameter less than the diameter of the retainer slots 78, 78'. This diameter is preferably ¼" diameter. This allows the belt retainer 130 to slide add on rotate freely within retainer slots 78, 78'. Belt retainer 130 is slidably fixed in retainer slots 78, 78' by a means for fixing, which is preferably a washer 134, welded adjacent each axial end 132, 132'. Alternatively, belt retainer 130 may be a threaded screw or rod and washers 134 may be nuts threaded onto the belt retainer. However, the outside diameter of any means for fixing 134 must be larger than the diameter of retaining slots 78, 78' to keep belt retainer 130 slidably fixed.

Strap 20 is placed over rollers 120 of strap corner 10 but passed underneath belt retainer 130. Because belt retainer 130 is mounted in retaining slots 78, 78' belt retainer 130 will stay in contact with strap 20 regardless of the size of strap 20. Therefore a cloth strap or chain can be used. Retainer slots 78, 78' also allow belt retainer 130 to rotate while in contact with strap 20 so that strap 20 can freely move across strap corner 10 and specifically roller 120 and under belt retainer 130. The size of retainer slots 78, 78' also allow different size straps 20 to freely pass underneath belt retainer 130 without binding. Therefore, chains 42, 44, as shown in FIG. 7 can also be used.

Belt retainer 130, prevents strap corner 10 from falling off a flatbed vehicle 18. The position of belt retainer 130 allows for the possibility of a strap 20 or strap corner 10 becoming loose enough to slide and fall off load 16. However, belt retainer 130 will prevent loss of strap corner 10 as well as keeping highways and other vehicles safe from falling objects or roadway debris. Since strap 20 is retained between rollers 120 and belt retainer 130, strap corner 10 will not separate from strap 20 unless strap 20 is completely severed.

An alternative embodiment of the strap corner 10 is shown in FIGS. 7 and 8. As shown in greater detail of FIG. 8, a strap corner 10 can be easily altered to fit the shape of any load. For example, support plate 54 is shown with a curvilinear surface adapted to fit in a substantial side-by-side contact with the coil 40 of FIG. 7. The curved surface of support plate 54 is shown as an arc having a radius substantially equal to the inside diameter of the eye 46 of coil 40. In this embodiment the tension forces exhibited on strap corner 10 by strap 20 are distributed to the coil 40 over the surface area of support plate 54. It is also possible to adapt support plate 54 to fit over other surfaces than shown.

The inside surface 56, 56' of first side plate 50 and second side plate 50' further includes an upper lip portion 136, 136'. Upper lip portion 136, 136' is that portion of inside surface 56, 56' which extend transversely from upper edge 66, 66' to the outer surface of rollers 120 of slide means 75. Further, the lower lip portions 138, 138' are defined on the inside surface 56, 56' of first and second plates 50 and 50' respectively. Lower lip portions 138, 138' are that portion of inside surface 56, 56' ends axially from axial ends 60, 60' to the outer surface of rollers 120 of slide means 75. In the preferred embodiment, 136, 136' and 138, 138' thereby form a channel 140 between inside surfaces 56, 56' and rollers 120. Strap 20 is then prevented from rolling or sliding off of strap corner 10 during transport, since strap 20 is retained in channel 140.

Referring now to FIG. 9, the preferred embodiment of strap corner 10 is shown for bringing a strap 20 gradually over a top corner edge 12, 14 of load 16. FIG. 9 will be discussed as first side plate 50. It is appreciated that second side plate 50' will have substantially equal dimensions in relation to first side plate 50. As shown, four pin openings 74a, 74b, 74c, and 74d are shown on side plate 50, each having a diameter of 21/32". Also shown is retainer slot 78, having a diameter at upper end 80 and lower end 82 of 5/16". In order that strap 20 passes gradually over top corner edges 12, 14 without binding, it has been found that rollers 74b, 74c, 74d should be placed on a single arc radius R. In the preferred embodiment, this radius is 2 15/16". Additionally, it has been found that lower end 82 of retainer slot 78 is best placed when the centerpoint 83 of lower end 82 is placed on the same common arc Z as pin openings 74b, 74c, 74d. Such a position allows for rolling side-by-side contact of belt retainer 130, with even the smallest strap 20.

In addition, retainer slot 78 must be sufficiently long enough to allow a large strap 20 such as the chains 42, 44 illustrated in FIG. 7 to slide under belt retainer 130 and over rollers 120 without binding. Another consideration in location of retainer slot 78, is to allow belt retainer 130 to slide freely while maintaining contact with strap 20. It has been found that when strap corner 10 is in its preferred orientation, as shown at FIGS. 1, 2 and 7, retainer slot 78 should be in a somewhat vertical position. Here, retainer slot 78 is shown having an angle at substantially 28° relative to axial ends 60, 62. It has thus been found that when the angle is 28° the distance from the centerpoint 81 at upper end 80 to centerpoint 83 at lower end 82, dimension S, is relatively equal to 1 1/16", this length of retainer slot 78 allows chains 42, 44 to pass freely under retainer slot 78 without binding, yet allows strap 20 to be an elongated cloth strap. Such a strap 20 is preferably used with strap corner 10.

It is shown that in the preferred embodiment pin openings 74b, 74c, and 74d are generally spaced along arc radius R such that dimensions B, C, D, and E are relatively determined. In the preferred embodiment, B generally is equal to ½", dimension C generally is equal to ⅜", dimension D is generally equal to 1 ⅜", while dimension E is generally equal to 1". Retainer slot 78, located in its preferred embodiment allows that dimension F is preferably equal to ⅜".

In addition, in the preferred embodiment pin opening centerpoints 110 are shown at a relative minimum distance H from upper edge 66 such that a relative distance G exists between a tangent line to a pin opening 74a adjacent to and parallel to upper edge 66 to form a lip 136 at the inside surface 56 adjacent to upper edge 66. The lip 136 confines strap 20 between inside surfaces 56, 56' if strap 20 is subject to rolling or sliding movement over rollers 120. In the preferred embodiment, distance H is generally equal to ½" when rollers 120 are preferably made from ½" schedule 40 pipe.

Likewise, pin opening centerpoints 110 are shown at a relative minimum distance J from axial end 60 such that a relative distance K exits between a tangent line to a pin opening 74d adjacent to and parallel to axial end 60 to form a lip 138 at the inside surface 56 adjacent to axial end 60. Like the lip 136, lip 138 confines strap 20 between inside surfaces 56, 56' if strap 20 slides from side to side over rollers 120. In the preferred embodiment, distance J is generally equal to ½", when rollers 120 are preferably made from ½" schedule 40 pipe.

Pin openings 74 are located in side plates 50, 50' such that when strap 20 is placed over rollers 120, strap 20 will not come into contact with any corner surface of strap corner 10 which could bind strap 20. Therefore, it is very important that pin openings 74 are located so that strap 20 will not intersect upper surface 90 of support plate 54 or inside lateral surface 96 of bottom plate leg 94.

The invention has been described with reference to the preferred embodiment. Obviously modifications and alterations will occur to others upon reading and understanding this specification. It is intended to include all such modifications and alterations in so far as they come within the scope of the invention.

Having thus described the invention, it is claimed:

1. A strap corner for tying a load by strap means comprising:

a lower support means for contacting said load, and opposed channel means for retaining said strap means, and retaining means for holding said strap means within said channel means, said retaining means forming an opening between said channel means and said retaining means, and including means for adjusting said opening size for accommodating different size strap means, said means for adjusting said opening size including elongated retainer slots for slidably mounting said retaining means.

2. The strap corner of claim 1, wherein said retaining means includes a belt retainer rod.

3. The strap corner of claim 1, wherein said channel means includes a first side plate and a second side plate having rollers disposed therebetween.

4. The strap corner of claim 1, wherein said lower support means includes a bearing segment and a leg segment, said bearing segment being longer than said leg segment.

5. A strap corner for tying a load by strap means comprising:

a member having a support surface for contacting said load and at least two rollers for allowing said strap means to be moved over said corner, each said roller having opposite ends attached to said member, each of said opposite ends further including a centerpoint, said centerpoints located on a common arc having a single arc radius, said corner including a retaining means for holding said strap means in contact with said corner, said retaining means including a belt retainer forming an opening between said belt retainer and said rollers and including means for adjusting said opening size for accommodating different size strap means, said means for adjusting including elongated retaining slots for slidable mounting said belt retainer.

* * * * *